US011718200B2

(12) United States Patent
Petersson et al.

(10) Patent No.: US 11,718,200 B2
(45) Date of Patent: Aug. 8, 2023

(54) FACILITATING BATTERY MAINTENANCE

(71) Applicant: Volvo Car Corporation, Gothenburg (SE)

(72) Inventors: Max Petersson, Gothenburg (SE); Ashok Chaitanya Koppisetty, Gothenburg (SE); Herman Johnsson, Gothenburg (SE); Bastian Havers-Zulka, Gothenburg (SE); Mats Gjertz, Stenungsund (SE); Peter Härslätt, Torslanda (SE); Asli Pehlivan Rhodin, Gothenburg (SE); Tessa Koelewijn, Odsmal (SE)

(73) Assignee: Volvo Car Corporation, Gothenburg (SE)

( * ) Notice: Subject to any disclaimer, the term of this patent is extended or adjusted under 35 U.S.C. 154(b) by 103 days.

(21) Appl. No.: 17/024,772

(22) Filed: Sep. 18, 2020

(65) Prior Publication Data

US 2021/0086659 A1 Mar. 25, 2021

(30) Foreign Application Priority Data

Sep. 24, 2019 (EP) .................................. 19199103

(51) Int. Cl.
*H02J 7/00* (2006.01)
*H02J 7/14* (2006.01)
*B60L 58/16* (2019.01)

(52) U.S. Cl.
CPC ............ *B60L 58/16* (2019.02); *H02J 7/0071* (2020.01); *B60L 2250/00* (2013.01)

(58) Field of Classification Search
CPC ................ B60L 58/16; H02J 7/0071
(Continued)

(56) References Cited

U.S. PATENT DOCUMENTS 7,705,602 B2 4/2010 Bertness
8,306,781 B2 * 11/2012 Xu ....................... G01R 31/367
320/132

(Continued)

FOREIGN PATENT DOCUMENTS

EP 2572951 A1 3/2013
EP 3309892 A1 4/2018
WO 20190131825 A1 7/2019

OTHER PUBLICATIONS

Mar. 19, 2020 European Search Report issue on International Application No. EP19199103.
(Continued)

*Primary Examiner* — Alexis B Pacheco
(74) *Attorney, Agent, or Firm* — Clements Bernard Walker; Christopher L. Bernard

(57) ABSTRACT

It is desirable to facilitate maintenance of a battery of a vehicle. Ideally, any non-optimal action performed on the battery—for instance excessive charging—should be identified such that an appropriate recommendation for a battery maintenance operation can be provided. For instance, a user of the vehicle may be instructed to charge the battery less often. Thus, in an embodiment, a device such as an Electronic Control Unit (ECU), will monitor one or more operational properties of the battery. Thereafter, the monitored property is evaluated by the ECU to determine an effect that the monitored property has on the lifetime of the battery. Based on this evaluation, the ECU performs an action with aim to prolong the lifetime of the battery, such as instructing a user of the vehicle to perform a particular action.

10 Claims, 8 Drawing Sheets

(58) Field of Classification Search
USPC .......................................................... 320/134
See application file for complete search history.

(56) References Cited

U.S. PATENT DOCUMENTS

| | | | |
|---|---|---|---|
| 8,536,825 B2 | 9/2013 | Kishiyama | |
| 2012/0296512 A1 | 11/2012 | Lee et al. | |
| 2013/0062941 A1* | 3/2013 | Yamamoto | B60L 3/0092 |
| | | | 307/10.6 |
| 2013/0320989 A1* | 12/2013 | Inoue | G01R 31/3842 |
| | | | 324/427 |
| 2016/0375782 A1* | 12/2016 | Liu | B60L 58/12 |
| | | | 320/109 |
| 2019/0329669 A1* | 10/2019 | Soeda | G06Q 20/29 |
| 2020/0047622 A1* | 2/2020 | Asr | H02J 7/007188 |
| 2021/0049480 A1* | 2/2021 | Kale | G05B 23/0283 |
| 2021/0074094 A1* | 3/2021 | Schumacher | B60L 53/68 |
| 2021/0078444 A1* | 3/2021 | Wang | H02J 7/0047 |
| 2021/0138929 A1* | 5/2021 | Kazuno | B60L 58/12 |
| 2021/0170907 A1* | 6/2021 | Yang | H02J 7/0048 |
| 2021/0394639 A1* | 12/2021 | Lu | G06Q 30/0208 |
| 2022/0085626 A1* | 3/2022 | Singh | B60L 53/665 |

OTHER PUBLICATIONS

Gordon, "How AI can revolutionise battery energy management systems", article, Oct. 9, 2017, pp. 1-7.
Park et al., Intelligent Vehicle Power Control based on Prediction of Road Type and Traffic Congestions, paper, pp. 1-6.
Dec. 19, 2022 Office Action issued in corresponding EP application No. 19199103.3.

* cited by examiner

FACILITATING BATTERY MAINTENANCE

CROSS-REFERENCE TO RELATED APPLICATION

The present disclosure claims the benefit of priority of co-pending European Patent Application No. 19199103.3, filed on Sep. 24, 2019, and entitled "FACILITATING BATTERY MAINTENANCE," the contents of which are incorporated in full by reference herein.

TECHNICAL FIELD

The present disclosure relates to methods of facilitating maintenance of a battery of a vehicle and devices performing the methods.

BACKGROUND

Electrification is somewhat of a paradigm shift currently occurring in the automotive industry. Traditional petrol and diesel cars are replaced with new hybrid and fully electric vehicles. Well-established car manufacturers are focusing on electrifying their fleets, turning away from a well-known skill sets of building combustion engines, and towards using a battery; a complicated chemical system.

The many rewards of electrification are accompanied by huge risks. The cost of the battery constitutes the better portion of the cost of the entire vehicle, and replacements will be expensive. Useful life of the battery is hence a critical factor for an electric/hybrid vehicle.

SUMMARY

One object is to solve, or at least mitigate, this problem in the art and to provide a method of facilitating maintenance of a battery of a vehicle.

It is desirable to facilitate maintenance of a battery of a vehicle. Ideally, any non-optimal action performed on the battery—for instance excessive charging—should be identified such that an appropriate recommendation for a battery maintenance operation can be provided. For instance, a user of the vehicle may be instructed to charge the battery less often. Thus, in an embodiment, a device such as an Electronic Control Unit (ECU), will monitor one or more operational properties of the battery. Thereafter, the monitored property is evaluated by the ECU to determine an effect that the monitored property has on the lifetime of the battery. Based on this evaluation, the ECU performs an action with aim to prolong the lifetime of the battery, such as instructing a user of the vehicle to perform a particular action.

Alternatively, the ECU reports any monitored properties to a supervising device, such as a cloud server, which creates the recommendation, possibly by taking into account reports of other vehicles.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the disclosure are shown.

These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

As mentioned, in hybrid/electric vehicles, the battery is a key component—and an expensive such. The useful life of the battery is thus a very important factor for these vehicles.

Useful life can be defined as the time interval where the battery is able to operate within the operational window for a certain application, for instance providing the proper capacity to give an electric vehicle a certain range or providing enough power to perform a strong acceleration. Over time the abilities of the battery will be impaired, the capacity will decrease, and so will the power.

Aging can thus be defined as any effect that decreases ability of a battery to deliver power within the operational window. This includes, but is not limited to, decreased capacity, power, increased leakage current, thermal runaways, etc. This decrease in ability is a symptom of an aging battery, and different ability parameters oftentimes act in combination, and may be reflected by a battery measure commonly known as State-of-health (SOH). Measuring SOH thus provides an indication of the aging of the battery.

The risks posed by a vehicle battery is mitigated if events potentially causing battery damage could be identified and properly responded to in order to increase the lifetime of the battery. One measure of lifetime is e.g. number of charge/discharge cycles over which the battery maintains a given fraction of its capacity.

Figure 1:
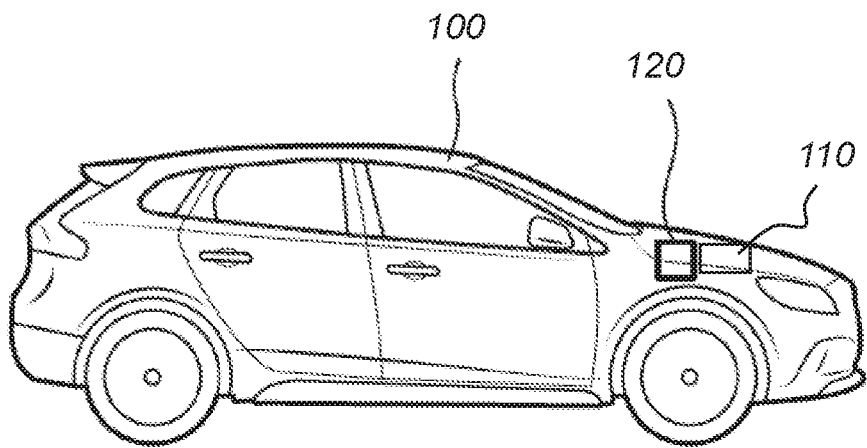
FIG. 1 illustrates an electric motor (or hybrid) vehicle according to an embodiment.

FIG. 1 illustrates an electric motor (or hybrid) vehicle 100 according to an embodiment. The vehicle 100 comprises a battery no such as a rechargeable lithium-ion battery which may be charged via a vehicle connector (not shown). It is noted that the car 100 illustrated in FIG. 1 is used as an example only. The method of performing diagnostics on a battery of a vehicle according to embodiments may be used in other vehicles, such as trucks, motorcycles, boats, aeroplanes, etc. An energy storage system such as a battery may be used in a vehicle traveling by land, sea or air, or in a stationary energy storage application. Further, it may be envisaged that the embodiments of this disclosure are implemented in other contexts, such as for example in stationary energy storage systems, aerospace applications, such as satellites, space suits and space stations, military applications, etc.

It is further envisaged that embodiments are implemented with other types of batteries, such as for instance of any of the following types: solid state, lithium-air, lead-acid, nickel-metal hydride, nickel Cadmium, etc.

The vehicle 100, or the battery no itself, is typically equipped with an Electronic Control Unit (ECU, 120), which may be implemented by one or more microprocessors executing appropriate software for controlling various systems and components in the vehicle. A car may contain a number of interconnected ECUs for controlling all properties of the car, thereby providing for instance a brake control module (BCM), a speed control module (SCM) or a Battery Management System (BMS). The ECU 120 may further be equipped with an interface for wireless transmission of data, for instance for wireless communication of various parameters and data and/or measured properties of the vehicle 100 to a remote location for further analysis. The ECU 120 may be equipped with data logging capabilities and the ability to analyze the logged data.

Figure 2:
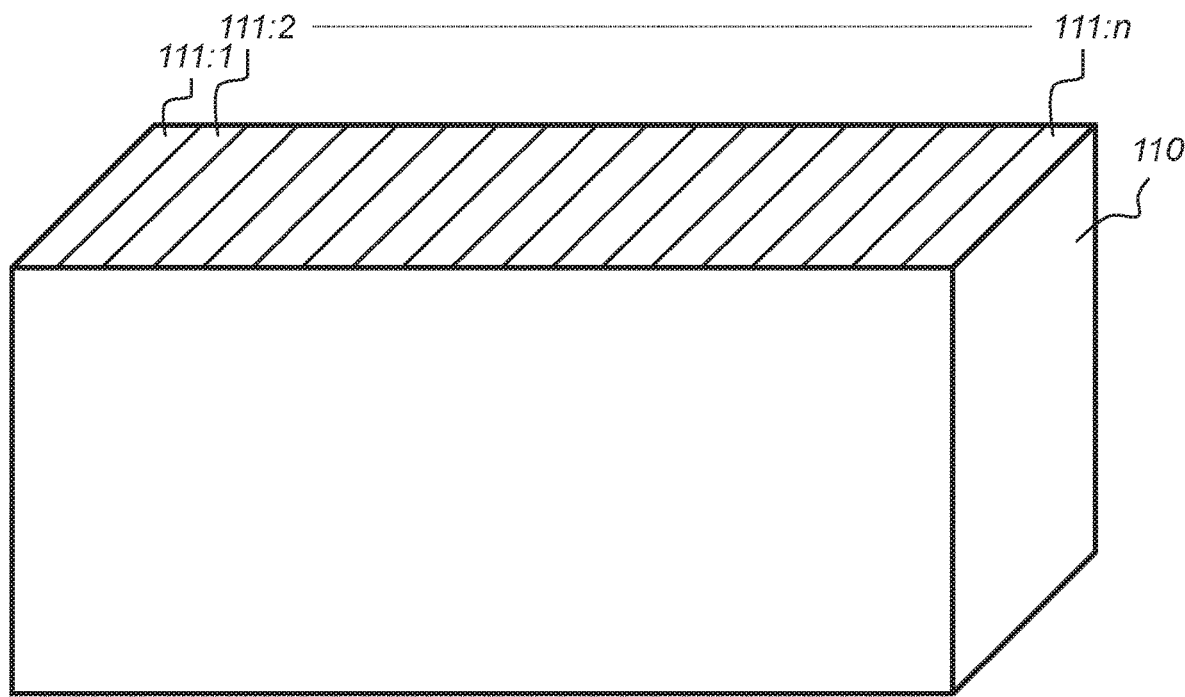
FIG. 2 illustrates a battery.

FIG. 2 illustrates a battery 110, commonly referred as a battery pack, which comprises a plurality of cells 111:1, . . . , 111:n. Battery cells 111 are electrochemical units interconnected to form the battery 110.

As previously discussed, it is desirable to facilitate maintenance of the battery 110 of the vehicle 100. Ideally, any non-optimal action performed on the battery—for instance excessive charging—should be identified such that an appropriate battery maintenance recommendation can be provided. For instance, a user of the vehicle 100 may be instructed to charge the battery no less often. Thus, in an embodiment, a device such as the ECU 120, will monitor one or more operational properties of the battery 110. Thereafter, the monitored property is evaluated by the ECU 120 to determine an effect that the monitored property has on the lifetime of the battery 110. Based on this evaluation, the ECU 120 performs an action with aim to prolong the lifetime of the battery 110. It is noted that operational properties may be monitored on a cell-level or for the battery 110 as a whole.

A practical example will be given in the following. Assuming that the ECU 120 (or the previously mentioned BMS) monitors an operational property of the battery 110 referred to as State of Charge (SoC). The SoC indicates charging level of an individual cell 111 or of the complete battery 110. There are numerous well-known methods of determining a value for the SoC of the battery 110 (where a fully charged battery has an SoC value of 100% while a fully discharged battery has a value of 0%), including both chemical (electrolyte) measurements and voltage measurements. The actual measurement method used will not be discussed in the following.

Thus, the ECU no may determine the SoC of each individual cell 111:1-111:n or the SoC for the battery 110 as a whole. It is further envisaged that the SoC for the battery 110 as a whole is obtained by evaluating the determined SoCs for each individual cell.

Figure 3:
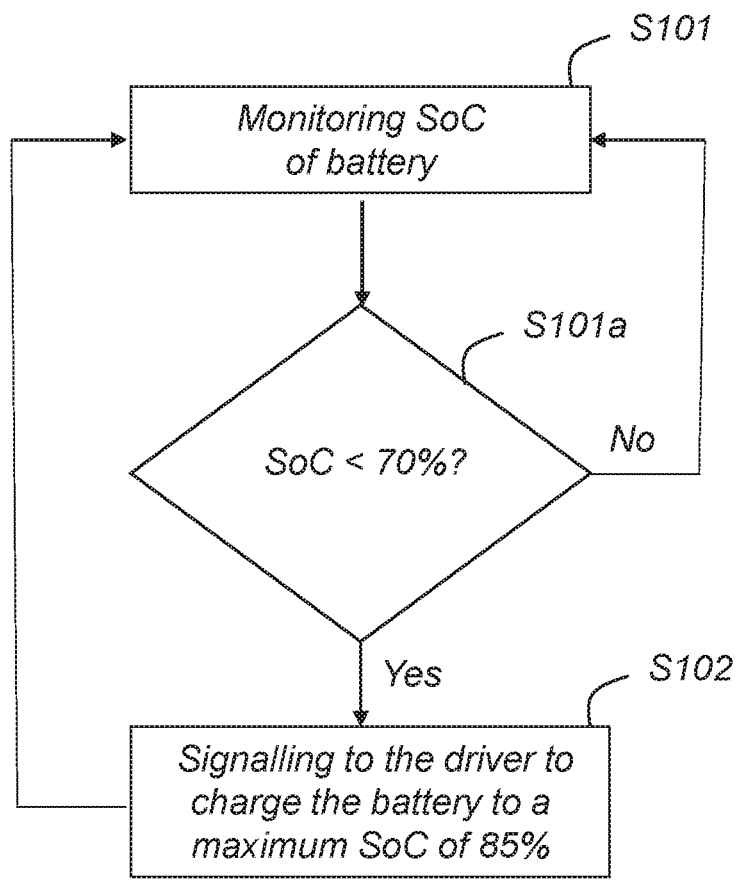
FIG. 3 shows a flowchart illustrating a method according to an embodiment of facilitating maintenance of a battery of a vehicle.

FIG. 3 shows a flow chart illustrating a method according to an embodiment of facilitating maintenance of the battery no of the vehicle 100. In a first step S101, the ECU 120 monitors the SoC of the battery 110 and determines that the SoC has decreased to a value of 68%.

For the battery 110 there may be a value for the SoC which is preferred, or even optimal, in terms of attaining a longest possible lifetime of the battery 110. In other words, there may exist a preferred value for the SoC of the battery 110 for which the lifetime of the battery 100 will be the longest.

This value may vary depending on the type of battery used and may even slightly vary in a population of batteries of the same type. In this example, it is assumed that the battery 110 used in the vehicle 100 preferably should have an SoC around 80%; at this SoC level, the lifetime of battery 110 is likely to be the longest.

Further, the ECU 120 could store information indicating that the value of the SoC at all times should be in the range 70-90%; as soon as the value of the SoC is not in this range, the ECU 120 should take action. Hence, in step S101a, the ECU 120 determines whether or not a result of the monitored SoC—i.e. SoC=68% complies with a preferred result considered to increase the battery lifetime—i.e. an SoC in the range 70-90%.

As a result of the monitored SoC decreasing to 68%, the ECU 120 performs an action in step S102 with aim to increase the lifetime of the battery 110. In this particular exemplifying embodiment, the ECU 120 signals to a driver of the vehicle—for example visually via a dashboard display of the vehicle 100—a recommendation for a battery maintenance operation such that the preferred result is better complied with. In this particular example, the maintenance recommendation to the driver is that the battery should be charged. As is understood, this is exemplifying only, and a lower threshold than 70% could be envisaged in practice. Further, the utility of the vehicle 100 is not affected; the driver can continue driving the vehicle even though the maintenance recommendation is given.

Moreover, in this embodiment, not only will the ECU 120 inform the driver that the battery 110 should be charged; the ECU 120 will further take the informed decision to signal to the driver that the battery should be charged to an SoC level of 85% and certainly not over 90%. Again, this does not affect the usability of the vehicle 100.

Thus, with embodiments, "bad" usage of batteries is prevented by indirectly monitoring user behavior. For instance, if an operational property such as battery charging time schedule is monitored, it is possible to recommend to a driver that the battery 110 preferably should be charged in the morning (possibly timer-based) instead of in the evening to limit the time period spent with high SOC. Hence, the result of the monitoring may be that the battery is charged in the evening, while the preferred result to be complied with is that the battery should be charged in the morning, wherein the driver is informed accordingly such that the preferred result is complied with.

It may even be envisaged that the ECU 120 itself, or in communication with the BMS, determine that the charging of the battery 110 is to be terminated if the SoC reaches a value of 90%. That could be straightforwardly attained by allowing the ECU 120 to control a relay connecting/disconnecting the battery 110 to/from a charging cable. Alternatively, in an embodiment, the ECU 120 may determine a preferred length of a charging period for the battery, such as 1 or 2 hours, after which the relay is controlled by the ECU 120 to discontinue the charging of the battery 100.

Advantageously, by performing an appropriate and informed action based on a monitored operational property of the battery, the ECU 120 could increase the lifetime of the battery 110 and thus accomplish a longer useful life of the battery 110 as compared to a scenario where no action is taken.

In the above-described exemplifying embodiment, the ECU 120 performs the action of signaling to the driver that charging of the battery 110 should be performed. However, in other embodiments, other actions are envisaged such as for instance signaling that another maintenance operation of the battery 110 is required, e.g. due to faulty cells, or that the battery 110 needs to be replaced. Hence, the ECU 120 may provide a variety of different recommendations for battery maintenance operations to be performed to the driver based on the monitored at least one operational property.

In a further embodiment the ECU 120 comprises a machine learning (ML) module which continuously is trained with new measurement data obtained through monitoring one or more operational properties of the battery 110. Thus, in the above-given example, the ECU 120 may utilize the ML module continuously processing measurement data to conclude that the optimal SoC for achieving the longest possible battery lifetime changes over time, say from a value of 80% to a values of 82%.

In further embodiments, other operational properties affecting the battery lifetime are envisaged to be monitored by the ECU 120, such as for instance Open Circuit Voltage (OCV) indicating the voltage difference between the two terminals of each battery cell, State of Health Cell Capacity (SoHCC) of a cell, which typically is defined as measured or computed amount of electric charge that the cell can deliver at rated voltage, State of Health Cell Resistance (SoHCR) of a cell, which typically is defined as measured or computed internal impedance of the cell, etc.

In further embodiments, other operational properties affecting the battery lifetime are envisaged to be monitored by the ECU 120, for instance battery temperature, current through each cell or the pack, current peaks, and voltage. These can also be compared to other symptoms of aging, such as State of Health Cell Capacity (SoHCC) of a cell, State of Health Cell Resistance (SoHCR) of a cell, leakage current, State of Health Power (SoHP), etc.

In an embodiment, one or more operational properties of the battery 110 is monitored by the ECU 120 and used by the ML module of the ECU 120 to estimate a point in time when battery maintenance is expected to be required. Advantageously, this may greatly ease the handling of the battery for the driver/user. Rather than suddenly noticing that the battery needs maintenance—or even that the battery has been permanently damaged and needs to be changed—the user is given timely notice such that a far more inexpensive maintenance operation may be undertaken.

Figure 4:
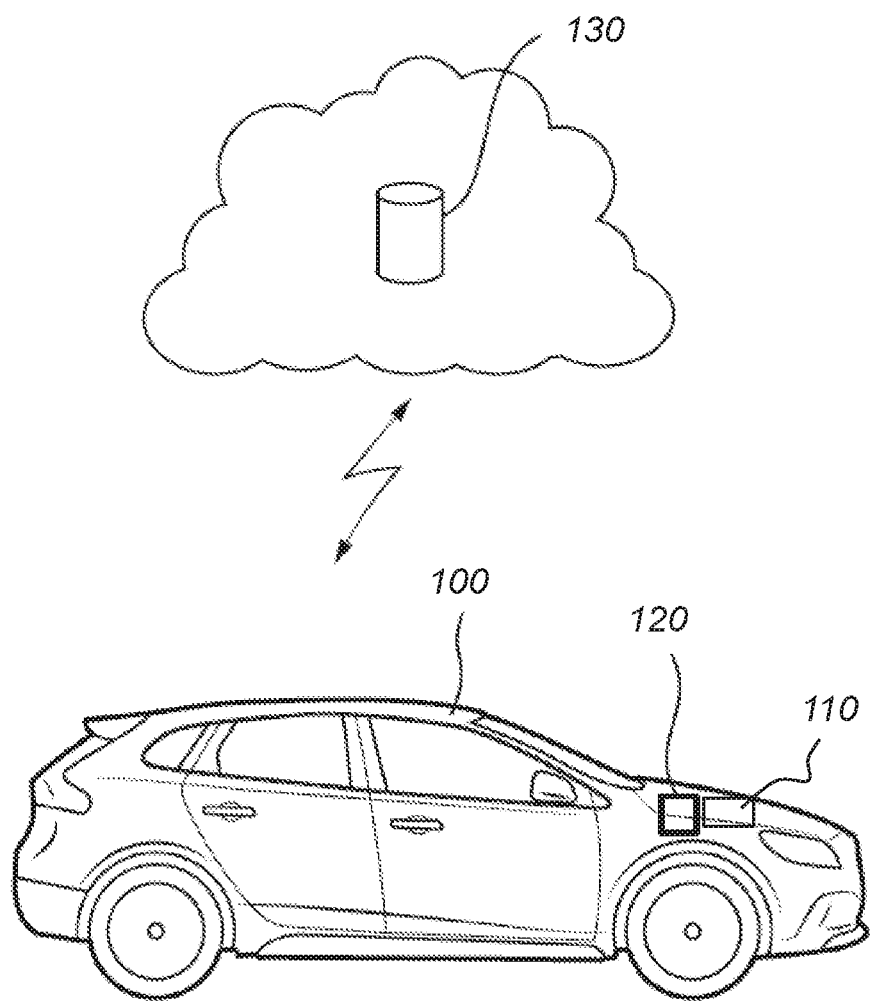
FIG. 4 shows a vehicle communicating with a cloud server according to an embodiment.
Figure 5:
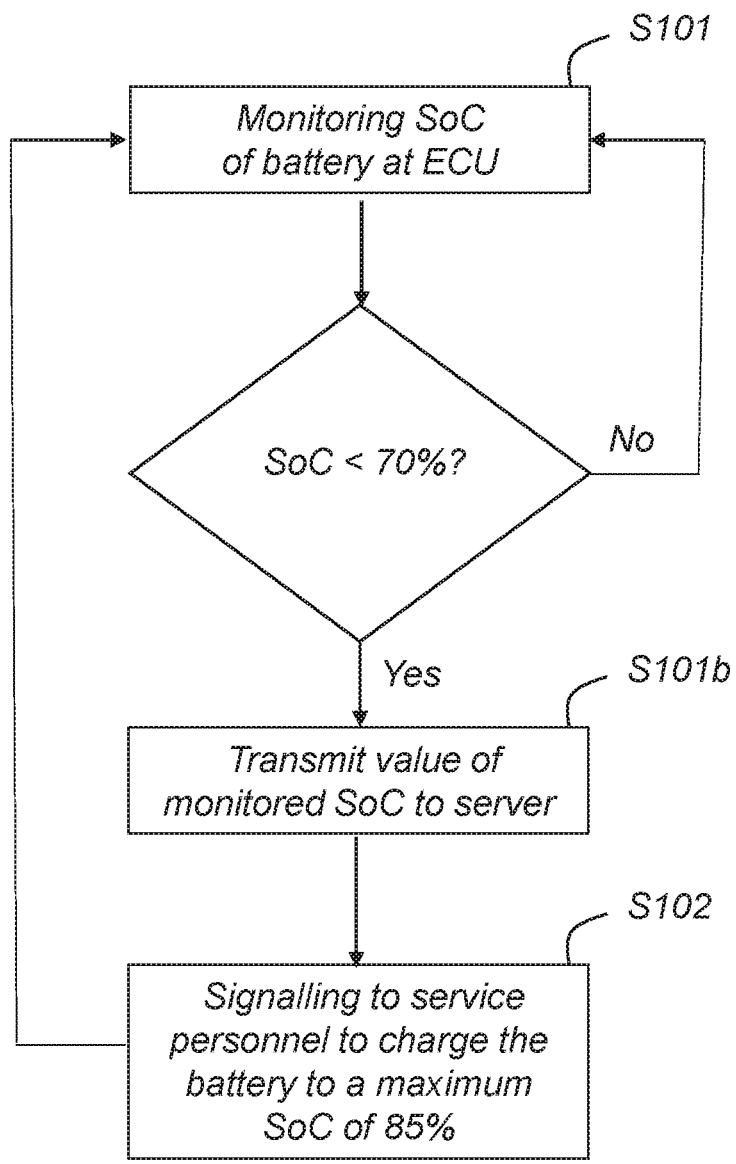
FIG. 5 shows a flowchart illustrating a method according to another embodiment of facilitating maintenance of a battery of a vehicle.

FIGS. 4 and 5 illustrate a further embodiment where the monitoring of the operational battery properties is performed by the ECU 120 in step S101, but the result of the monitoring—for instance in the form of measured values of the monitored properties—is wirelessly communicated in step S101b to a remote location such as for example a server 130 of for instance a car manufacturer, a car rental agency or a car pool operator, where the server 130 will determine which action to perform for extending the lifetime of the battery 110 based on the monitored properties. The server 130 will thus act as a supervising device.

Such action may indeed include signaling the driver as in the example of FIG. 3 by providing a preferred SoC to which the battery should comply upon being charged. However, the server 130 may alternatively in an example conclude that the driver is about to return the car 110 to the car pool operator/car rental agency, in which case it is not meaningful to signal to the driver that the battery 110 needs charging.

Instead, the server 130 may signal in step S101a to service personnel at the car pool operator/car rental agency that the battery 110 should be charged to reach the preferred SoC. Thus, the action taken by the ECU 120 with aim to improve the lifetime of the battery 110 based on the monitored at least one operational property comprises sending the value of the monitored SoC to the server in step S101b to cause the server 130 to signal to service personnel in step S102 that the battery 110 needs to be charged.

In the flowchart of FIG. 5, it is illustrated that the ECU 120 determines whether a value of the monitored SoC falls under 70% or not. However, it may alternatively be envisaged that all the measured values of SoC are sent in step S101a to the server 130, which will conclude whether or not the received values comply with SoC requirements.

Again with reference to FIG. 4, in an alternative embodiment, not only the single vehicle 100 transmits results of monitored operational properties of the battery 110 to the server 130, but each one of the cars of a car fleet (to which the vehicle 100 belongs) of the car manufacturer/car pool operator/car rental agency transmits correspondingly monitored operational properties of the battery for each individual car to the server 130.

Now, the server 130 would preferably be equipped with one or more ML modules being trained with the enormous amount of battery data with which it is supplied by the cars in the car fleet. Thus, in practice, the server 130 has access to each and every one of the individual batteries of the vehicles included in the car fleet supervised by the server 130. In other words, a network of battery diagnostic systems is interconnected via the server 130, where each system is accessible by the server 130.

It is thus envisaged that each individual vehicle in the fleet reports results of the monitored operational parameters of the battery accommodated in the individual vehicle to the server 130. The action performed by the server 130 on an individual battery may then be based on monitored operational properties of all or a subset of the batteries of the vehicles included in the car fleet supervised by the server 130.

In an example, assuming that the preferred value of the SoC of a battery is evaluated (from the monitored SoC of all or a subset of the car fleet batteries) to be 82%, then the server 130 may signal that accordingly to a driver of the vehicle 100. Further, from that information the server may conclude that the optimal range of SoC level is 72-92% rather than 70-90%, which also may be communicated to the vehicle 100 and to one or more—or all—of the vehicles in the fleet.

In the art, the registering of operational properties of a great number of batteries is difficult to achieve, even in a laboratory setting. Since a massive number of batteries (and amount of time) is required. Moreover, mimicking the battery usage reflecting an increasingly complex customer landscape is complex and expensive as regards for instance driving patterns and charging settings. In the above-described embodiment, data is monitored and collected under real-life conditions.

Figure 6:
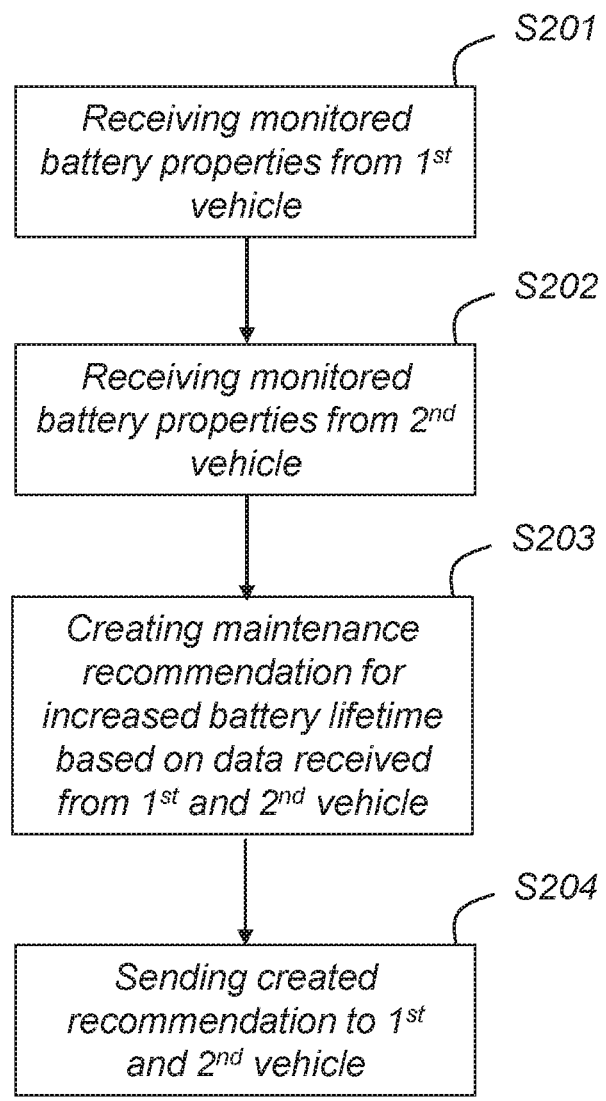
FIG. 6 shows a flowchart illustrating a method according to yet another embodiment of facilitating maintenance of a battery of a vehicle.

Again, with reference to FIG. 4 and further to the flowchart of FIG. 6 illustrating a method of facilitating maintenance of a battery of a vehicle, an embodiment will be described where a fleet of vehicles monitor operational properties of the battery of each vehicle and reports the results to the server 130 which will draw conclusions based on the reported data and take action with the aim to increase the lifetime of the batteries, such as sending a maintenance recommendation to a driver of one or more of the vehicles (or even the ECU of a vehicle). For instance, the recommendation could be that the battery maintenance operation to be performed should be to charge the battery in the morning (instead of in the evening).

In this example, the following battery properties are monitored: SoC, cell temperature (CT), ambient temperature (T), and State of Health (SoH). SoH is typically 100% at the time of manufacture and will decrease over time.

Operational properties SoC, CT and T are measured with a high resolution (such as every second), while the SoH is changing slowly and measured more seldom (such as on a weekly basis).

By analyzing historical data of the battery, the ECU 120 of first vehicle 100 may conclude that a particular operational property setting which has been monitored appears to be damaging to the battery 110. For instance, in this particular example, the ECU 120 concludes that the setting SOC=30-70%, CT>30° C. and T>20° C. appears to be damaging to the battery based on statistical and machine learning methods identifying correlation with one or many of the symptoms of battery aging. This result is reported to the server 130 in step S201 which stores the reported setting for the first vehicle 100. A second vehicle (not shown in FIG. 4) has observed that the following setting appears to be damaging to the battery arranged in the second vehicle: SOC=20-50%, CT>30° C., and T>20° C., and reports the setting to the server 130 in step S202.

Hence, the server 130 receives, in steps S201 and S202, a result of a plurality of monitored operational properties affecting lifetime of the battery arranged in each of the two vehicles, in this example SoC, CT and T. It is noted that this is an example only, and the server 130 may in practice receive results of monitored battery properties from hundreds or even thousands of cars in the fleet. As is understood, any data resulting from the monitored battery properties may be pre-processed at the cars before being sent to the server.

Based on these two reported results, the server 130 concludes in step S203 that a setting constituting for instance an overlap of the two settings is damaging to the battery 110. The server 130 thus concludes that the resulting setting SOC=30-50%, CT>30° C. and T>20° C., is the actual damaging setting for a battery. In other words, the server 130 determines whether or not a result of the monitored operational properties received from the two vehicles complies with a preferred result—i.e. to avoid SOC=30-50%, CT>30° C. and T>20° C.—considered to increase the lifetime of the battery (which is not the case in this example).

Hence, in step S203, the server 130 creates a recommendation of a maintenance operation to be performed with aim to increase battery lifetime based on the received observations. In this example, the recommendation is to avoid the setting SOC 30-50%, CT>30° C. and T>20° C.

The server 130 subsequently reports this setting to a driver of the first vehicle 100 and to a driver of the second vehicle (and potentially to any driver and/or ECU of a vehicle in the fleet) in step S204.

In the embodiment of FIG. 6, not only the single vehicle 100 transmits results of monitored operational properties of the battery 110 to the server 130, but each one of the cars of a car fleet (to which the vehicle 100 belongs) of the car manufacturer/car pool operator/car rental agency transmits correspondingly monitored operational properties of the battery for each individual car to the server 130.

The server 130 thus in practice has access to each and every one of the individual batteries of the vehicles included in the car fleet supervised by the server 130. Each individual vehicle in the fleet may thus report observations of the monitored operational parameters of the battery accommodated in the individual vehicle to the server 130. The action performed by the server 130 on an individual battery may then be based on monitored operational properties of all or a subset of the batteries of the vehicles included in the car fleet supervised by the server 130.

In the art, the registering of operational properties of a great number of batteries is difficult to achieve, even in a laboratory setting. Since a massive number of batteries (and amount of time) is required. Moreover, mimicking the battery usage reflecting an increasingly complex customer landscape is complex and expensive as regards for instance driving patterns and charging settings. In the above-described embodiment, data is monitored and collected under real-life conditions.

In another embodiment, the ECU 120 of the first vehicle 100 included in a fleet of vehicle reports that the driver of the first vehicle 100 appears to be charging the vehicle 100 every day when parked in a garage. The ECU 120 may either inform the driver that this will decrease the lifetime of the battery 100, thereby enabling for the driver to instead increase the lifetime of the battery 110 by performing the charging more seldom, or report the observation to the server 130.

Further, the battery of a second vehicle in the fleet always appears to be charged when the SoC already is very low, which is damaging and thus decreases the lifetime of the battery. Again, an ECU may alert a driver that this behavior is damaging, or report the observation to the server 130.

Moreover, the battery of a third vehicle in the fleet always appears to be charged when the SoC already is very low, which is damaging and thus decreases the lifetime of the battery. Again, an ECU may alert a driver that this behavior is damaging, or report the observation to the server 130. If the three observations are reported to the server 130, the server 130 may create a maintenance recommendation based on the reported observations and send the recommendation to the driver of the respective vehicle. For instance, the maintenance recommendation may comprise a preferred SoC level at which each battery optimally is to be charged.

In a further embodiment, the server 130 will create and store a user profile based on the reported observations of a vehicle associated with the user for which the profile is created. For instance, the ECU 120 may report that the user normally only drives a short stretch on Fridays thus consuming only a small amount of energy provided by the battery, and that the battery 110 as a consequence does not need to be fully charged. Hence, as soon as the vehicle 100 reports monitored operational properties of the battery 110, where the result of the observations does not comply with the stored user profile, the server 130 will send a maintenance recommendation accordingly. For instance, if the observations indicate excessive battery charging, an appropriate maintenance recommendation may be to inform the user to charge the battery 110 less often.

In another embodiment, the processing onboard the vehicle is done by machine learning models to provide a latent space of features that describes the system with good resolution but in limited amount of data. These latent space features may or may not be human readable but is transferred to the server 130 which has a similar machine learning model to read the features and access its impact on the vehicle 100 and other vehicles in the fleet. This approach also provides privacy to the user of the vehicle.

Figure 7:
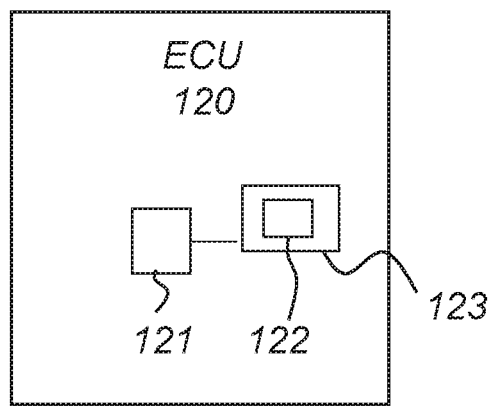
FIG. 7 illustrates an ECU according to an embodiment.

FIG. 7 illustrates an ECU 120 included in the vehicle 100 according to an embodiment. The steps of the method of facilitating maintenance of a battery of a vehicle according to embodiments are in practice performed by a processing unit 121 embodied in the form of one or more microprocessors arranged to execute a computer program 122 downloaded to a suitable storage volatile medium 123 associated with the microprocessor, such as a Random Access Memory (RAM), or a non-volatile storage medium such as a Flash memory or a hard disk drive. The processing unit 121 is arranged to cause the ECU 120 to carry out the method according to embodiments when the appropriate computer program 122 comprising computer-executable instructions embodied in a non-transitory computer-readable medium is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc.

Figure 8:
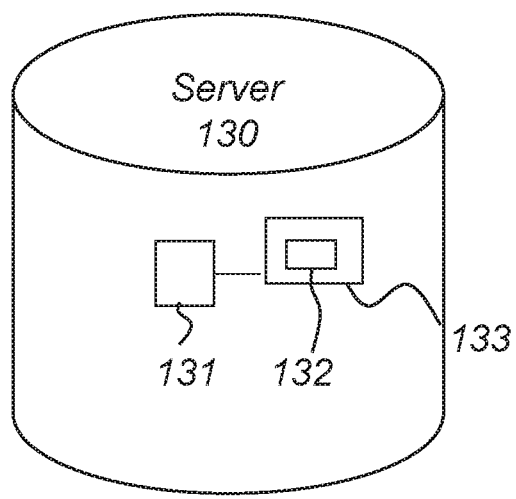
FIG. 8 illustrates a supervising device according to an embodiment.

FIG. 8 illustrates a server 130 according to an embodiment. The steps of the method of facilitating maintenance of a battery of a vehicle according to embodiments are in practice performed by a processing unit 131 embodied in the form of one or more microprocessors arranged to execute a computer program 132 downloaded to a suitable storage volatile medium 133 associated with the microprocessor, such as a RAM, or a non-volatile storage medium such as a Flash memory or a hard disk drive. The processing unit 131 is arranged to cause the server 130 to carry out the method according to embodiments when the appropriate computer program 132 comprising computer-executable instructions is downloaded to the storage medium 133 and executed by the processing unit 131. The storage medium 133 may also be a computer program product comprising the computer program 132. Alternatively, the computer program 132 may be transferred to the storage medium 133 by means of a suitable computer program product, such as a DVD or a memory stick. As a further alternative, the computer program 132 may be downloaded to the storage medium 133 over a network. The processing unit 131 may alternatively be embodied in the form of a DSP, an ASIC, an FPGA, a CPLD, etc.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of facilitating maintenance of a battery of a vehicle, the method comprising:

monitoring at least one operational property of the battery of the vehicle affecting lifetime of the battery of the vehicle; and monitoring the at least one operational property of a battery of another vehicle affecting lifetime of the battery of the other vehicle;

determining whether or not a result of the monitored at least one operational property complies with a preferred result considered to increase the lifetime of the battery of the vehicle and the battery of the other vehicle; and if not:

providing, to a driver of the vehicle, a recommendation for a battery maintenance operation such that the preferred result is better complied with and an estimated point in time when battery maintenance is expected to be required; and controlling, by means of a control unit, charging of the battery of the vehicle based on the monitored at least one operational property and in accordance with the recommendation for the battery maintenance operation such that the lifetime of the battery of the vehicle is increased.

2. The method of claim 1, wherein the controlling of charging of the battery comprises:

controlling length of a charging period for the battery.

3. The method of claim 1, wherein the controlling of charging of the battery comprises:

controlling a level of charging of the battery.

4. The method of claim 1, further comprising:

sending, to a supervising device, a result of the monitored at least one operational property, the supervising device being configured to receive results of the monitored at least one operational property from further vehicles.

5. The method of claim 4, further comprising:

receiving, from the supervising device, a recommendation on a battery maintenance operation to be performed based on the result of the monitored at least one operational property of at least one of said further vehicles.

6. A method of a supervising device of facilitating maintenance of a battery of one vehicle among a plurality of vehicles, the method comprising:

receiving a result of at least one monitored operational property affecting lifetime of a battery arranged in each of the plurality of vehicles; and determining whether or not a result of the monitored at least one operational property received from the one of the plurality of vehicles complies with a preferred result considered to increase lifetime of the battery of multiple of the plurality of vehicles; and if not:

creating a recommendation for a battery maintenance operation to be performed such that the preferred result is better complied with comprising an estimated point in time when battery maintenance is expected to be required;

sending the created recommendation to a driver of the one of the plurality of vehicles; and controlling, by means of a control unit, charging of the battery of the one of the plurality of vehicles based on the monitored at least one operational property and in accordance with the recommendation for the battery maintenance operation such that the lifetime of the battery of the one of the plurality of batteries is increased.

7. A computer program comprising computer-executable instructions for causing a device to perform steps recited in claim 1 when the computer-executable instructions are executed on a processing unit included in the device.

8. A computer program product comprising a non-transitory computer readable medium, the non-transitory computer readable medium having the computer program according to claim 7 embodied thereon.

9. A control unit configured to facilitate maintenance of a battery of a vehicle, the control unit comprising a processing unit and a memory, said memory containing instructions executable by said processing unit, whereby the control unit is operative to:
- monitor at least one operational property of the battery of the vehicle affecting lifetime of the battery of the vehicle; and
- monitor the at least one operational property of a battery of another vehicle affecting lifetime of the battery of the other vehicle;
- determine whether or not a result of the monitored at least one operational property complies with a preferred result considered to increase the lifetime of the battery of the vehicle and the battery of the other vehicle; and if not:
- provide, to a driver of the vehicle, a recommendation for a battery maintenance operation such that the preferred result is better complied with and an estimated point in time when battery maintenance is expected to be required; and
- control, by means of a control unit, charging of the battery of the vehicle based on the monitored at least one operational property and in accordance with the recommendation for the battery maintenance operation such that the lifetime of the battery of the vehicle is increased.

10. A supervising device configured to facilitate maintenance of a battery of a vehicle, the supervising device comprising a processing unit and a memory, said memory containing instructions executable by said processing unit, whereby the supervising device is operative to:
- receive a result of at least one monitored operational property affecting lifetime of a battery arranged in each of a plurality of vehicles; and
- determine whether or not a result of the monitored at least one operational property received from the one of the plurality of vehicles complies with a preferred result considered to increase lifetime of the battery of multiple of the plurality of vehicles; and if not:
- create a recommendation for a battery maintenance operation to be performed such that the preferred result is better complied with comprising an estimated point in time when battery maintenance is expected to be required;
- send the created recommendation to a driver of the one of the plurality of vehicles; and
- control, by means of a control unit, charging of the battery of the one of the plurality of vehicles based on the monitored at least one operational property and in accordance with the recommendation for the battery maintenance operation such that the lifetime of the battery of the one of the plurality of batteries is increased.

* * * * *